(No Model.)
W. C. WILLIAMSON.
FRICTION CLUTCH.
No. 303,689. Patented Aug. 19, 1884.
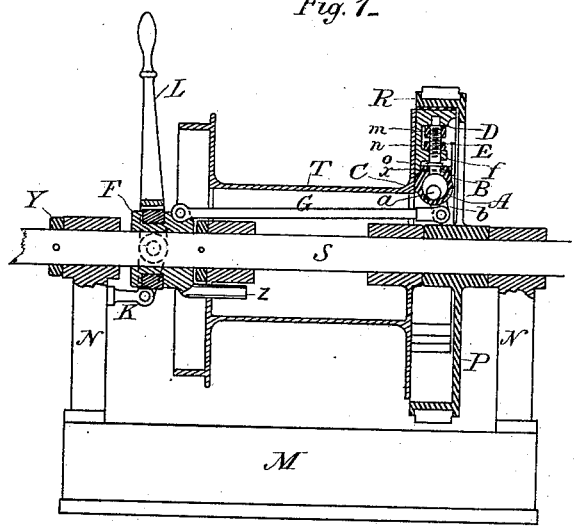
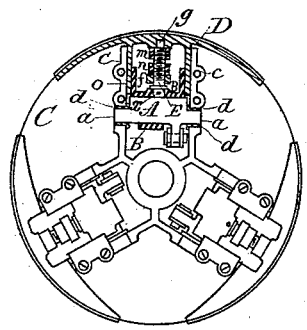
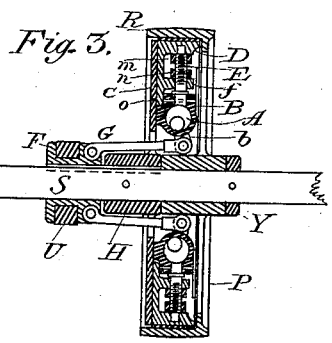
WITNESSES:
Leo Von Rosenberg
Francis P. Reilly
INVENTOR
William C. Williamson
by R. M. Voorhees
ATTORNEY

UNITED STATES PATENT OFFICE.

WILLIAM C. WILLIAMSON, OF PHILADELPHIA, PENNSYLVANIA, ASSIGNOR TO WILLIAMSON BROTHERS, OF SAME PLACE.

FRICTION-CLUTCH.

SPECIFICATION forming part of Letters Patent No. 303,689, dated August 19, 1884.

Application filed June 28, 1884. (No model.)

*To all whom it may concern:*

Be it known that I, WILLIAM C. WILLIAMSON, of the city and county of Philadelphia, in the State of Pennsylvania, have invented a new and useful Improvement in Friction-Clutches for Rotary Shafts, Pulleys, or Drums, which improvement is fully set forth and illustrated in the following specification and accompanying drawings.

The object of this invention is to provide a strong, durable, efficient, and very neat method of connecting together and disconnecting fast and loose pulleys or drums and pulleys or gear-wheels running on the same shaft, or to connect the two parts of a severed line of shafting by means of a fixed pulley on one part, a sliding clutch or clutch-pulley on the other part.

The invention consists of the parts hereinafter particularly described, as specifically set forth in the claim.

In the accompanying drawings, Figure 1 is a sectional elevation of a winding or hoisting drum, mounted on internal bearings turning on a central shaft, and provided with a clutch for connecting and disconnecting the drum to a spur-wheel keyed fast to said shaft. Fig. 2 is an end view of the clutch mechanism, partly in section, shown in Fig. 1. Fig. 3 is a vertical cross-section through a sliding collar and attached clutch mechanism keyed to a central shaft, the clutch being operated to engage and disengage a loose pulley on said shaft.

In said figures, the letter A indicates an eccentric, which is turned on its shaft or fulcrum $a$ by means of its arm $b$, to which arm is attached one end of the rod G, whose other end is attached to a sliding collar, F. Surrounding said eccentric A is a strap and sliding block or box, B, which raises and depresses the friction block or shoe D when raised or depressed itself by the eccentric A. The flange C is provided with guides $c\ c$ and bearings $d\ d$. Within said guides the base or shank $o$ of the shoe D slides, and within said shank the sliding box B is fitted, as more clearly shown in Fig. 2. Said shank $o$ of the shoe D is also provided with a flange or lug, $f$, through which the adjusting screw-bolt E is set. Said bolt is pinned at its lower end to the sliding box B, as clearly shown in the several figures at $x$, and its upper end is let into a hole in the shoe D, as at $g$. Above and below the lug $f$ the bolt E is provided with jam-nuts $m\ n$. The upper nut, $m$, rests against the inner side or rim of the shoe D, and the lower nut, $n$, rests upon the upper side of the lug $f$. As the shoe wears from use, the upper nut is screwed up against the shoe D, taking up this wear and virtually lengthening the shank of the shoe. The lower nut, $n$, being screwed down upon the lug $f$, makes the necessary adjustment for the withdrawal of the shoe from frictional contact with the rim or flange R of the gear-wheel P, as shown in Fig. 1, or pulley P, as shown in Fig. 3.

To the sliding collar F is fitted a strap, U, and to said strap is secured an ordinary forked hand-lever, L, such as is usually fitted to sliding clutches, the ends of the forks being pinned or pivoted to any suitable fulcrum or fulcra, as shown at K, Fig. 1.

In Fig. 1 the flange C forms part of the winding-drum T. In Fig. 3 the flange C is simply the radial part of the hub H, keyed fast to the shaft S. In this figure the collar F slides upon a feather in said shaft or upon a prolonged key, by which the hub H is keyed to the shaft S. In Fig. 1 the collar F slides without any feather, but also revolves with the drum T in either direction of winding or unwinding. The collar F and the drum T are held in the same relative positions radially by the guide rod or rods $z$, extending from the collar F, and fitting with a neat sliding fit into a hole or holes in the end of the drum. The collar F will thus slide on the shaft and also turn with the drum T, the guide or guides $z$ preventing torsional strain upon the rods G. The gear-wheel P, Fig. 1, is keyed fast to the shaft S. Said shaft is supported in bearings on the pillow-blocks N N, set upon a bedplate, M, Fig. 1. The collar Y is pinned fast to the shaft S to take the thrust of the gear-wheel P, Fig. 1, or pulley P, Fig. 3, and prevent them from slipping away from the shoe D when the clutch is applied or coupled.

The operation of this device can now be readily understood. To throw the clutch in, (the position indicated by Fig. 1,) the hand-lever L is thrown over to the right, as shown in said figure, which causes the sliding collar F to push the three rods G to the right. This will turn the full of the eccentric A to the left, and force the shoe D up against the rim R of the gear-wheel or pulley P, making a close frictional contact therewith. By throwing the hand-lever L in the opposite direction the eccentric A will draw down the shoes D by a positive motion, no springs being required to break contact, and the uncoupling of drum and gear-wheel or fast and loose pulley will be instantaneously effected. When this clutch is applied to line-shafting, the eccentric is moved over to its extreme throw for throwing the clutch in. Little or no end-thrust (and consequent tendency to work loose) is thus communicated to the parts. The shoe D may be faced with wood, leather, or any other suitable frictional surface.

Having thus fully described my said improvement, as of my invention I claim—

In a friction-clutch for rotary pulleys, drums, or shafts, the combination of an eccentric, as A, operating within a strap and block or sliding box, as B, and a friction-shoe, as D, attached to said box, all co-operating substantially as and for the purpose set forth.

WILLIAM C. WILLIAMSON.

Witnesses:
MATHIAS SEDDINGER,
C. WESLEY RUFFELL.